(12) United States Patent
Maeda

(10) Patent No.: US 12,315,138 B2
(45) Date of Patent: May 27, 2025

(54) INFORMATION PROCESSING APPARATUS, SETTING METHOD, INSPECTION SYSTEM, AND MEDIUM

(71) Applicant: CANON KABUSHIKI KAISHA, Tokyo (JP)

(72) Inventor: Yusuke Maeda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 196 days.

(21) Appl. No.: 18/179,590

(22) Filed: Mar. 7, 2023

(65) Prior Publication Data

US 2023/0298160 A1    Sep. 21, 2023

(30) Foreign Application Priority Data

Mar. 16, 2022 (JP) .................... 2022-041761

(51) Int. Cl.
*G06T 7/00* (2017.01)
*G06F 3/12* (2006.01)
*G06V 30/19* (2022.01)

(52) U.S. Cl.
CPC ............ *G06T 7/001* (2013.01); *G06F 3/1208* (2013.01); *G06F 3/1256* (2013.01); *G06V 30/19093* (2022.01); *G06T 2200/24* (2013.01); *G06T 2207/20092* (2013.01); *G06T 2207/30144* (2013.01)

(58) Field of Classification Search
None
See application file for complete search history.

(56) References Cited

U.S. PATENT DOCUMENTS 8,576,233 B2 *  11/2013  Miyazawa  ............ G06F 40/109
                                                        715/269
2016/0075130 A1 *  3/2016  Landa  .................... B41J 2/0057
                                                        347/103

FOREIGN PATENT DOCUMENTS

JP          2016-009223 A      1/2016

* cited by examiner

*Primary Examiner* — Darryl V Dottin
(74) *Attorney, Agent, or Firm* — Venable LLP

(57) ABSTRACT

An information processing apparatus is provided. The apparatus registers, in a candidate list, in association with an inspection region of the reference image set on the setting screen, font data as a candidate of reference font data as a reference for character recognition at the time of inspection of a printed product, and sets the reference font data on the setting screen in accordance with a user selection from the candidate list. In the registering, among preregistered registration font data, font data whose similarity with a character string of the inspection region of the reference image exceeds a threshold is registered in the candidate list.

10 Claims, 16 Drawing Sheets

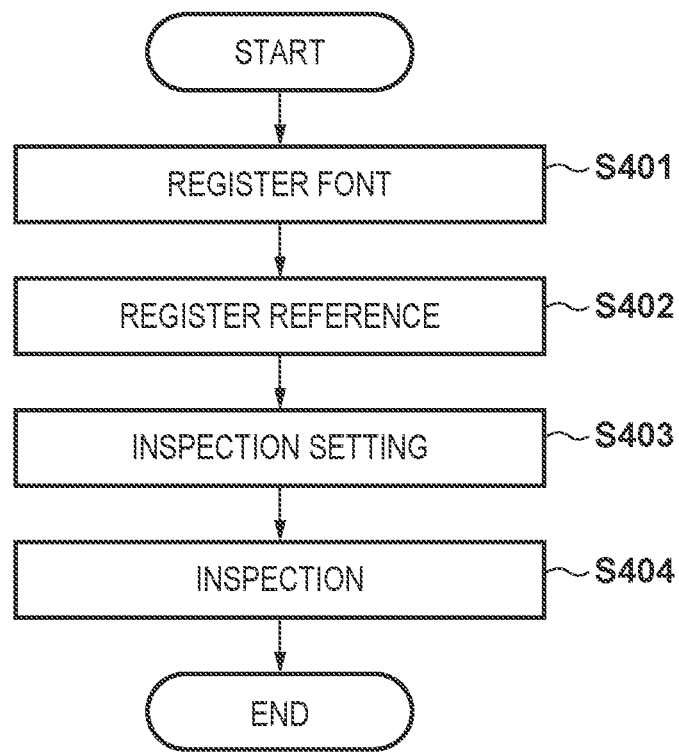

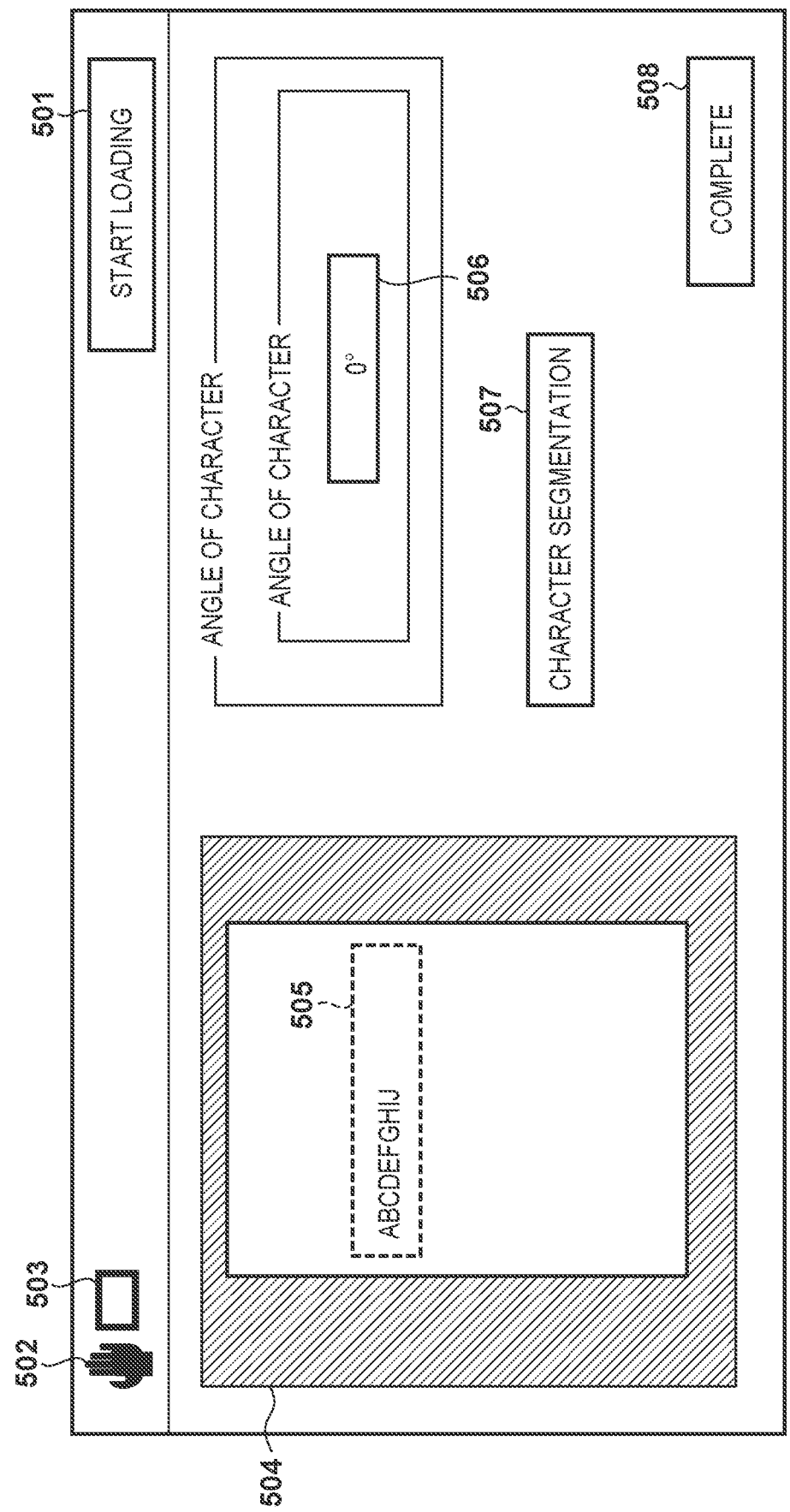

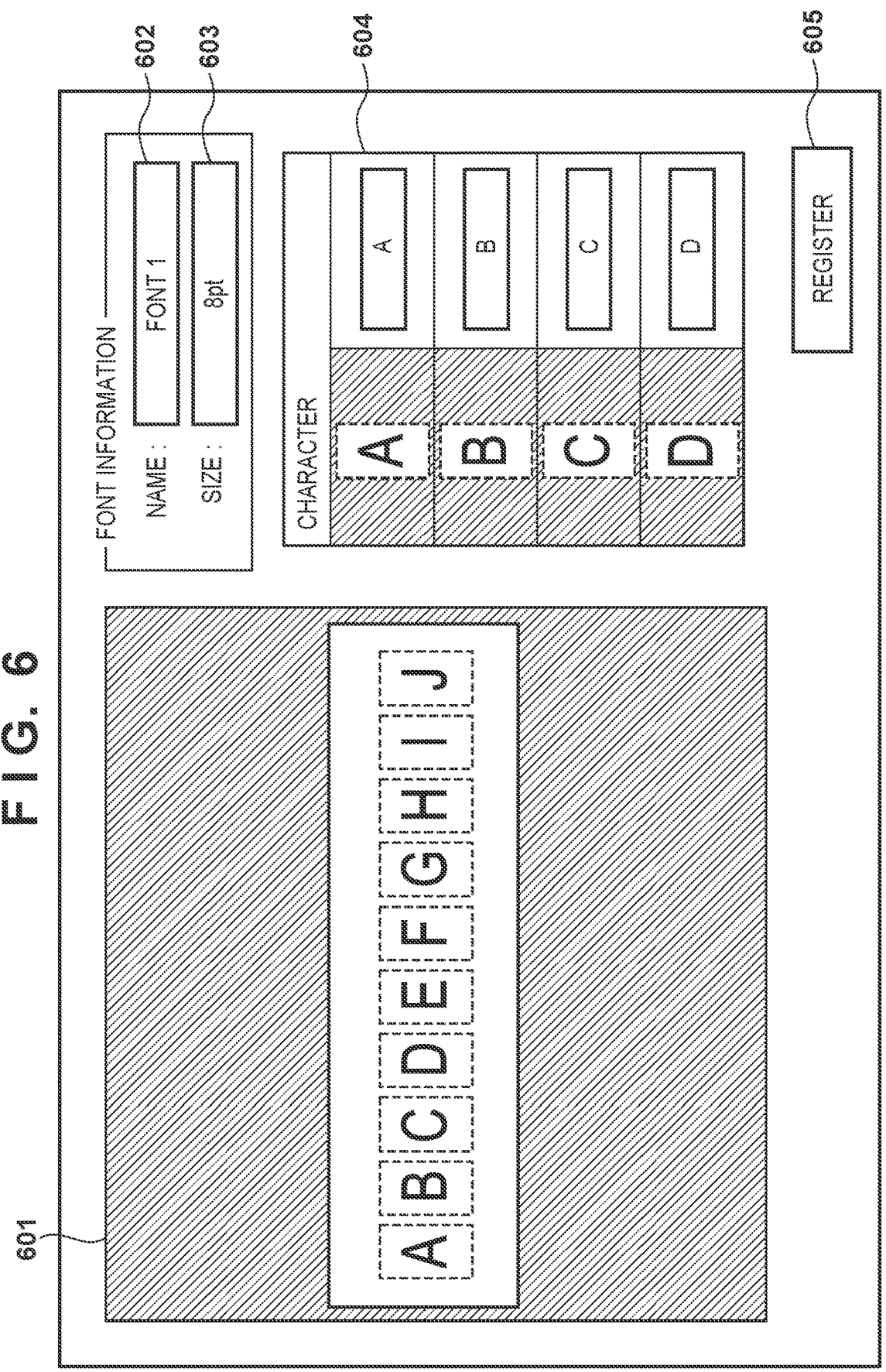

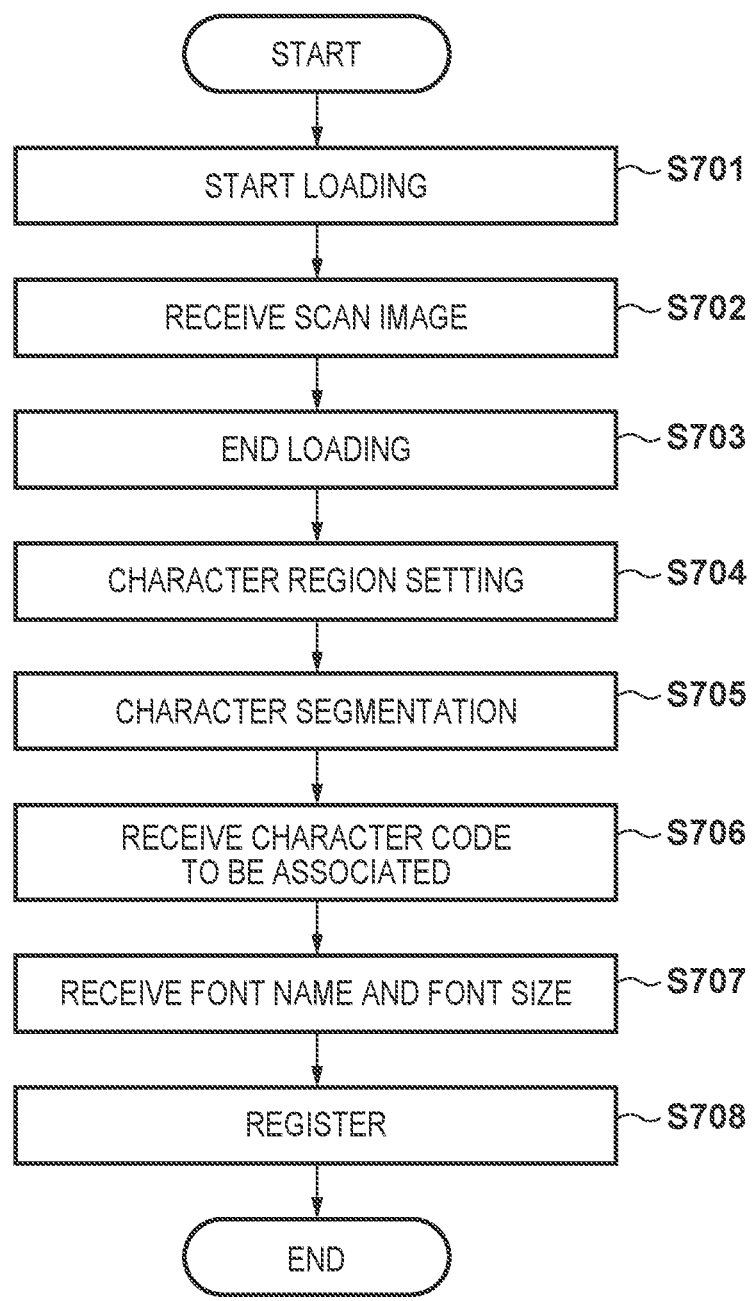

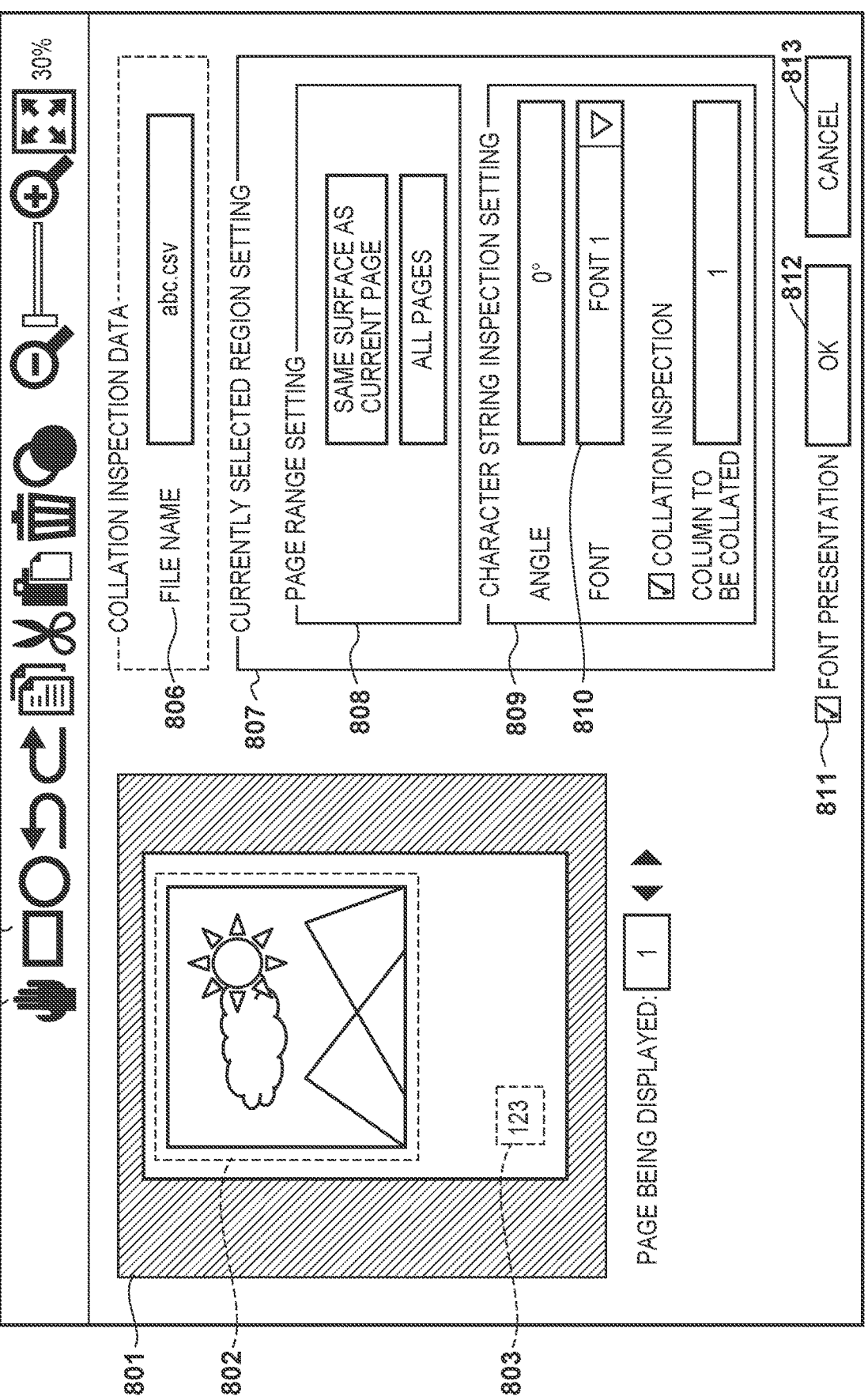

FIG. 14A

1401 — ALL REGISTRATION FONT DATA

| FONT 1 | FONT 2 | FONT 3 | FONT A | FONT B | FONT C |

FIG. 14B

1402 — CANDIDATE LIST

| FONT 1 | FONT A |

FIG. 14C

809 — CHARACTER STRING INSPECTION SETTING

| ANGLE | 0° |
| FONT | 810 ▽ |
| ☑ COLLATION INSPECTION COLUMN TO BE COLLATED | FONT 1 / FONT A — 814 |

FIG. 14D

809 — CHARACTER STRING INSPECTION SETTING

| ANGLE | 0° |
| FONT | 810 ▽ |
| ☑ COLLATION INSPECTION COLUMN TO BE COLLATED | FONT 1 / FONT A / FONT 2 / FONT 3 — 814 |

INFORMATION PROCESSING APPARATUS, SETTING METHOD, INSPECTION SYSTEM, AND MEDIUM

BACKGROUND OF THE INVENTION

Field of the Invention

The present invention relates to an information processing apparatus for inspecting print quality of a printed product, a setting method, an inspection system, and a medium.

Description of the Related Art

In recent years, there is known a printing system in which an inspection apparatus can inspect, during conveyance, a sheet printed by a printing apparatus. In inspection of a print sheet, the inspection apparatus reads an image on the conveyed print sheet, and determines whether the print sheet is normal by performing image analysis of the read image. The inspection apparatus can detect a defective sheet including, for example, omission of a barcode or ruled line, a lack of an image, a print failure, a lack of a page, or color misregistration. If it is determined that the print sheet is a defective sheet, the defective sheet is discharged to a discharge destination different from that of a normal sheet. This can prevent a defective sheet from being mixed in normal sheets, thereby allowing an operator to discard the defective sheet.

In inspection of a character string, character recognition processing is performed, using the font dictionary of the character string, for a region where the character string is printed, and inspection is executed by collating a recognition result with correct answer data. At this time, there is a problem that if the user does not know the font of the character string to be inspected, the user does not know a font dictionary to be set. Japanese Patent Laid-Open No. 2016-009223 describes an embodiment in which character recognition processing is performed for a region where a character string is printed, and if it is determined that an output character recognition ratio is lower than a predetermined recognition ratio threshold, a warning display screen is output, and an approximate font is presented in a case in which a recognized font type is incorrect.

However, in Japanese Patent Laid-Open No. 2016-009223, since a correct answer font needs to be set in advance, and an approximate font is presented after performing inspection, this is not a presentation timing desired by the user.

SUMMARY OF THE INVENTION

To solve the above problem, in the present invention, by presenting accurate correct answer font candidates to the user before confirming inspection settings, a font is accurately set within a short time without putting a labor on the user.

According to one aspect of the present invention, there is provided an information processing apparatus comprising: at least one memory configured to store at least one program; and at least one processor, wherein the at least one program causes the at least one processor to display, on a display, a setting screen including a preview display of a reference image, register, in a candidate list, in association with an inspection region of the reference image set on the setting screen, font data as a candidate of reference font data as a reference for character recognition at the time of inspection of a printed product, and set the reference font data on the setting screen in accordance with a user selection from the candidate list, wherein in the registering, among preregistered registration font data, font data whose similarity with a character string of the inspection region of the reference image exceeds a threshold is registered in the candidate list.

According to the present invention, by presenting accurate font candidates to the user before confirming inspection settings, it is possible to set a font accurately within a short time without putting a labor on the user.

Further features of the present invention will become apparent from the following description of exemplary embodiments with reference to the attached drawings.

BRIEF DESCRIPTION OF THE DRAWINGS

FIG. 4 is a flowchart illustrating whole inspection;

FIG. 5 is a view showing a font registration screen;

FIG. 6 is a view showing a character segmentation screen;

FIG. 7 is a flowchart illustrating font registration;

FIG. 8A is a view showing an inspection setting screen;

FIGS. 14A to 14D are views showing a method of displaying registration font data on the character string inspection setting item screen.

DESCRIPTION OF THE EMBODIMENTS

Figure 1:
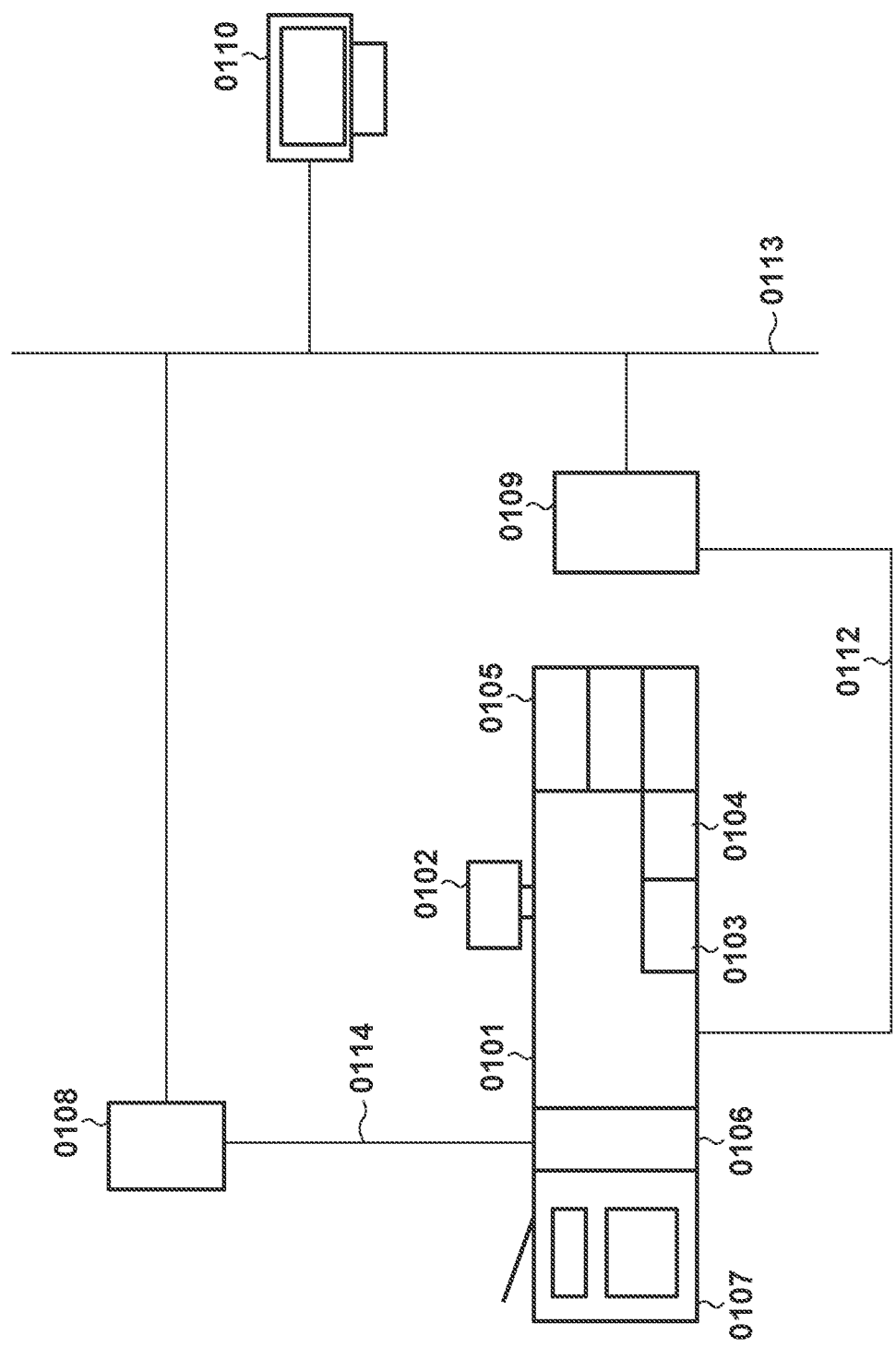
FIG. 1 is a schematic view showing the configuration of an information processing apparatus, an inspection apparatus, and a printing apparatus.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

Configuration of Image Forming System

FIG. 1 is a schematic view showing the configuration of an image forming system (or inspection system) including an information processing apparatus, an inspection apparatus, and an image forming apparatus according to this embodiment. Note that the image forming apparatus of this embodiment will be described using an electrophotographic type image forming apparatus. However, the image forming apparatus according to this embodiment may be an image forming apparatus of another image forming type such as an inkjet type or an offset type. The image forming apparatus will sometimes be referred to as a printing apparatus hereinafter.

An image forming apparatus 0101 is connected to an information processing apparatus 0109 via a cable 0112. The information processing apparatus 0109 is connected to a client computer 0110 and an inspection apparatus 0108 via a network 0113. The image forming apparatus 0101 includes a UI panel 0102, a paper feed deck 0103, and a paper feed deck 0104. Furthermore, an optional deck 0105 including three stages of paper feed decks is connected. The image forming apparatus 0101 is, for example, an electrophotographic type image forming apparatus. In addition, the UI panel 0102 is, for example, a user interface including an electrostatic capacitance type touch panel.

Furthermore, the image forming apparatus 0101 includes an inspection unit 0106 and a large capacity stacker 0107. The inspection unit is connected to the inspection apparatus 0108 via a cable 0114. The large capacity stacker 0107 includes a main tray and a top tray, and several thousand paper sheets can be stacked on the main tray at once.

A print job is generated by the client computer 0110, transmitted to the information processing apparatus 0109 via the network 0113, and managed by the information processing apparatus 0109. The print job is then transmitted from the information processing apparatus 0109 to the image forming apparatus 0101 via the cable 0112, and the image forming apparatus 0101 performs processing of printing on a paper sheet. Note that the print job may be generated and managed by the information processing apparatus 0109, transmitted to the image forming apparatus 0101 via the cable 0112, and managed by the image forming apparatus 0101.

Note that the client computer 0110, the information processing apparatus 0109, and the inspection apparatus 0108 may be connected to the cable 0112 so as to be communicable with the image forming apparatus 0101. That is, the connection form among the image forming apparatus 0101, the information processing apparatus 0109, and the client computer 0110 in this embodiment is merely an example, and there are various connection forms other than that described in this embodiment, as a matter of course.

Figure 2:
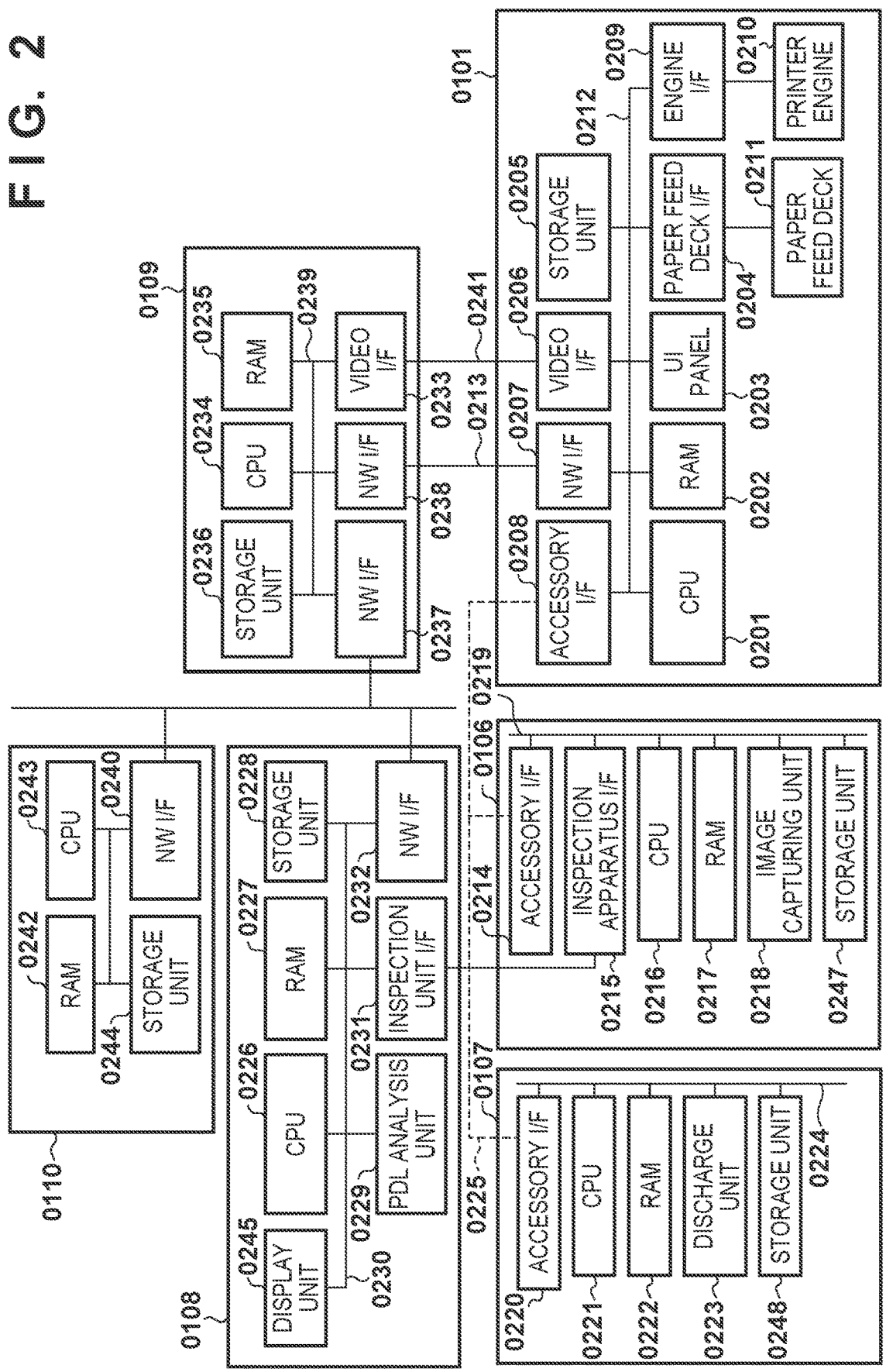
FIG. 2 is a block diagram showing the configuration of the information processing apparatus, the inspection apparatus, and the printing apparatus.

FIG. 2 is a block diagram showing the control configuration of the image forming apparatus 0101, the inspection apparatus 0108, the large capacity stacker 0107, the information processing apparatus 0109, and the client computer 0110 according to this embodiment.

Hardware Configuration of Image Forming Apparatus 0101

A CPU (Central Processing Unit) 0201 conducts control and operations of units in the image forming apparatus 0101 via a system bus 0212. The CPU 0201 conducts execution of programs stored in a storage unit 0205 and loaded into a RAM (Random Access Memory) 0202. The RAM 0202 is a kind of general volatile storage device that the CPU 0201 can directly access, and is used as the work area of the CPU 0201 or another temporary data storage area. The storage unit 0205 functions as a temporary storage area and a work memory at the time of the operation of the image forming apparatus.

An engine I/F 0209 conducts communication with a printer engine 0210 and control thereof. A paper feed deck I/F 0204 conducts communication with a paper feed deck 0211 and control thereof. The paper feed deck 0211 is the general term of hardware configurations for the paper feed decks 0103 and 0104 and the optional deck 0105. A UI panel 0203 is the hardware configuration of the UI panel 0102, and is a user interface configured to perform the general operation of the image forming apparatus 0101. In this embodiment, the UI panel 0203 includes an electrostatic capacitance type touch panel.

A network interface (to be referred to as an NW I/F hereinafter) 0207 is connected to an NW I/F 0238 of the information processing apparatus 0109 via a cable 0213, and conducts communication between the information processing apparatus 0109 and the image forming apparatus 0101. Note that in this example, interfaces connected to the system bus 0212 and a system bus 0239 are directly connected to each other. The information processing apparatus 0109 and the image forming apparatus 0101 may be connected via, for example, a network, and the connection form is not limited. A video I/F 0206 is connected to a video I/F 0233 via a video cable 0241, and conducts communication of image data between the information processing apparatus 0109 and the image forming apparatus 0101.

Note that the connection interface of the information processing apparatus 0109 to the image forming apparatus 0101 may integrate the functions of the NW I/F 0238 and the video I/F 0233. In addition, the connection interface of the image forming apparatus 0101 to the information processing apparatus 0109 may integrate the functions of the NW I/F 0207 and the video I/F 0206.

An accessory I/F 0208 is connected to an accessory I/F 0214 and an accessory I/F 0220 via a cable 0225. That is, the image forming apparatus 0101 communicates with the inspection unit 0106 and the large capacity stacker 0107 via the accessory I/Fs 0208, 0214, and 0220.

Hardware Configuration of Inspection Unit 0106

A CPU 0216 conducts control and operations of units in the inspection unit 0106 via a system bus 0219, and execution of programs stored in a storage unit 0247 and loaded into a RAM 0217. The RAM 0217 is a kind of general volatile storage device that the CPU 0216 can directly access, and is used as the work area of the CPU 0216 or another temporary data storage area. The storage unit 0247 functions as a temporary storage area and a work memory at the time of the operation of the inspection apparatus. An inspection apparatus I/F 0215 is connected to an inspection unit I/F 0231 via a cable 0114. That is, the inspection unit 0106 communicates with the inspection apparatus 0108 via the inspection apparatus I/F 0215 and the inspection unit I/F 0231.

An image capturing unit 0218 has an image capturing function with, for example, a contact image sensor (to be referred to as a CIS hereinafter), captures a paper sheet passing through the inspection unit, and transmits the captured image to the inspection apparatus 0108 via the inspection apparatus I/F 0215. Note that the CIS of the image capturing unit 0218 is an example of a sensor, a sensor of another type such as a CCD image sensor may be used, and the image capturing method thereof is not limited.

Hardware Configuration of Large Capacity Stacker 0107

A CPU 0221 conducts control and operations of units in the large capacity stacker 0107 via a system bus 0224, and execution of programs stored in a storage unit 0248 and loaded into a RAM 0222. The RAM 0222 is a kind of general volatile storage device that the CPU 0221 can directly access, and is used as the work area of the CPU 0221 or another temporary data storage area. The storage unit 0248 functions as a temporary storage area and a work memory at the time of the operation of the inspection apparatus. A discharge unit 0223 conducts a discharge operation to the main tray and the top tray and monitoring and control of the stacking state on each of the main tray and the top tray.

Hardware Configuration of Inspection Apparatus 0108

A CPU 0226 conducts control and operations of units in the inspection apparatus 0108 via a system bus 0230, and execution of programs stored in a storage unit 0228 and loaded into a RAM 0227. The RAM 0227 is a kind of general volatile storage device that the CPU 0226 can directly access, and is used as the work area of the CPU 0226 or another temporary data storage area. The storage unit 0228 functions as a temporary storage area and a work memory at the time of the operation of the inspection apparatus. A PDL analysis unit 0229 loads PDL data such as PDF, PostScript, and PCL received from the client computer 0110 or the information processing apparatus 0109, and executes interpretation processing. A display unit 0245 is, for example, a liquid crystal display connected to the inspection apparatus, and accepts a user input to the inspection apparatus or displays the state of the inspection apparatus.

Hardware Configuration of Information Processing Apparatus 0109

A CPU 0234 conducts control and operations of units in the information processing apparatus 0109 via the system bus 0239, and execution of programs stored in a storage unit 0236 and loaded into a RAM 0235. The RAM 0235 is a kind of general volatile storage device that the CPU 0234 can directly access, and is used as the work area of the CPU 0234 or another temporary data storage area. The storage unit 0236 functions as a temporary storage area and a work memory at the time of the operation of the information processing apparatus. A network interface (to be referred to as an NW I/F hereinafter) 0237 is connected to NW I/Fs 0232 and 0240 via a network. The information processing apparatus 0109 communicates with the inspection apparatus 0108 via the NW I/F 0237 and the NW I/F 0232. Furthermore, the information processing apparatus 0109 communicates with the client computer 0110 via the NW I/F 0237 and the NW I/F 0240.

Hardware Configuration of Client Computer 0110

A CPU 0243 conducts control and operations of units in the client computer 0110 via a system bus 0246, and execution of programs stored in a storage unit 0244 and loaded into a RAM 0242. The RAM 0242 is a kind of general volatile storage device that the CPU 0243 can directly access, and is used as the work area of the CPU 0243 or another temporary data storage area. The storage unit 0244 functions as a temporary storage area and a work memory at the time of the operation of the client computer.

Image Forming and Medium Conveyance Mechanism

Figure 3:
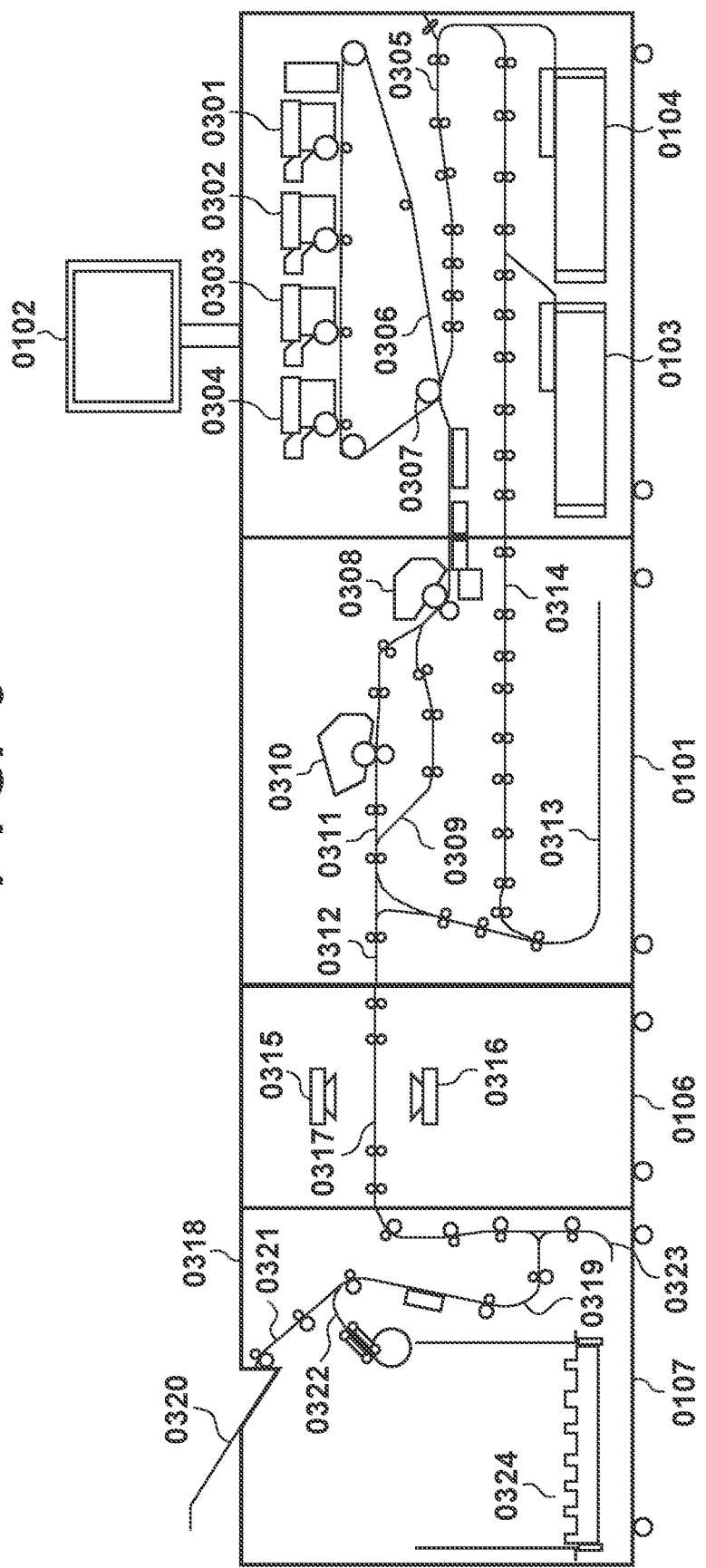
FIG. 3 is a view showing the internal configuration of the information processing apparatus, an inspection unit, the printing apparatus, and a large capacity stacker.

FIG. 3 is a view showing the internal configuration of the image forming apparatus 0101, the inspection unit 0106, and the large capacity stacker 0107. The image forming apparatus 0101 accepts a user input via the UI panel 0102 or displays the state of printing or a device. Various kinds of paper sheets can be stored in the paper feed decks 0103 and 0104. In each paper feed deck, only the uppermost one of the stored paper sheets can be separated and conveyed to a paper sheet conveyance path 0305. To form a color image, development stations 0301 to 0304 form toner images using color toners of Y, M, C, and K, respectively. The toner image formed here is primarily transferred to an intermediate transfer belt 0306. The intermediate transfer belt 0306 rotates clockwise in FIG. 3, and the toner image is transferred, at a secondary transfer position 0307, to the paper sheet conveyed from the paper sheet conveyance path 0305. A fixing unit 0308 includes a pressurizing roller and a heating roller. When the paper sheet passes between the rollers, the toner is melted and press-bonded, thereby fixing the toner image on the paper sheet. The paper sheet that has left the fixing unit 0308 is conveyed to a discharge port 0312 via a paper sheet conveyance path 0309. Depending on the paper sheet type, further melting and press-bonding may be necessary for fixing. In this case, the paper sheet is conveyed to a second fixing unit 0310 using an upper paper sheet conveyance path after passing through the fixing unit 0308, undergoes additional melting and press-bonding, and is then conveyed to the discharge port 0312 via a paper sheet conveyance path 0311. If the image forming mode is a double-sided mode, the paper sheet is conveyed to a paper sheet reversing path 0313, reversed in the paper sheet reversing path 0313, and conveyed to a double-sided conveyance path 0314, thereby performing image transfer to the second surface at the secondary transfer position 0307.

In the inspection unit 0106, CISs 0315 and 0316 are arranged facing each other. The CIS 0315 is a contact image sensor configured to read the upper surface of the paper sheet, and the CIS 0316 is a contact image sensor configured to read the lower surface of the paper sheet. The inspection unit 0106 scans the paper sheet using the CISs 0315 and 0316 at a timing when the paper sheet conveyed to a paper sheet conveyance path 0317 reaches a predetermined position. The scanned image is transmitted to the inspection apparatus 0108 via the inspection apparatus I/F 0215 and the inspection unit I/F 0231. The CPU 0226 of the inspection apparatus 0108 determines whether the received image includes a defect, and notifies the inspection unit 0106 of the determination result via the inspection unit I/F 0231 and the inspection apparatus I/F 0215. The CPU 0216 of the inspection unit 0106 notifies the large capacity stacker 0107 of the received determination result via the accessory I/Fs 0214 and 0220.

The large capacity stacker 0107 is a stacker that can stack a large capacity of paper sheets. The large capacity stacker 0107 includes a main tray 0324 as a tray on which paper sheets are stacked. The paper sheet that has passed through the inspection unit 0106 enters the large capacity stacker 0107 via a paper sheet conveyance path 0319. From the paper sheet conveyance path 0319, the paper sheet is stacked on the main tray 0324 via a paper sheet conveyance path 0322. Furthermore, the large capacity stacker 0107 includes a top tray 0320 as a discharge tray. The CPU 0221 of the large capacity stacker 0107 discharges, to the top tray 0320, a paper sheet in which a defect is detected by the inspection apparatus 0108. To output a paper sheet to the top tray 0320, the paper sheet is conveyed from the paper sheet conveyance path 0319 to the top tray 0320 via a paper sheet conveyance path 0321. To stack a paper sheet on the main tray 0324, a reversing portion 0323 configured to reverse the paper sheet is used. When stacking a paper sheet on the main tray 0324, the paper sheet is reversed once by the reversing portion 0323 such that the direction of the paper sheet that enters becomes the same as the direction of the paper sheet upon stacking. When conveying a paper sheet to the top tray 0320, the paper sheet is directly discharged without being flipped at the time of stacking, and thus the reversing operation in the reversing portion 0323 is not performed.

Processes as the characteristics of the present invention will be described below with reference to examples of screens and flowcharts. Note that the program of the image forming apparatus according to this procedure is stored in the storage unit 0205 of the image forming apparatus 0101, read out into the RAM 0202, and executed by the CPU 0201. The program of the inspection apparatus according to this procedure is stored in the storage unit 0228 of the inspection apparatus 0108, read out into the RAM 0227, and executed by the CPU 0226. The program of the information processing apparatus according to this procedure is stored in the storage unit 0236 of the information processing apparatus 0109, read out into the RAM 0235, and executed by the CPU 0234. The program of the client computer according to this procedure is stored in the storage unit 0244 of the client computer 0110, read out into the RAM 0242, and executed by the CPU 0243.

The whole procedure from a font registration operation before the start of inspection to execution of inspection will be described with reference to a flowchart shown in FIG. 4.

Inspection Procedure

In font registration in step S401, the user creates registration font data. The registration font data is data obtained by associating, with a character code, the shape image of a character necessary for character recognition (OCR) executed at the time of data inspection. The registration font data is data as a reference for quality evaluation of a character image. The inspection apparatus 0108 starts to load a font registration image, and the client computer 0110 executes a print job for font registration. In this embodiment, the print job for font registration is a print job for printing a font of the same shape and size as those used in a printed product as an inspection target, and the same paper sheet as the printed product as the inspection target is used. The print job for font registration may be a print job for printing the same contents as those of a print job for actual printing. Note that font registration may be performed using test printing of the inspection target, or registration may be performed using a reference image.

Next, in step S402, the user registers a reference image as an inspection reference. The inspection apparatus 0108 starts to load the reference image, and the client computer 0110 executes a print job for reference image registration. The reference image is an image as a reference for evaluating a printed image. Note that the reference image may be registered using test printing of the inspection target.

Next, in step S403, the user performs inspection setting processing to set various inspection parameters, an inspection region, and an inspection level. Details will be described later.

Next, in step S404, the user starts inspection in the inspection apparatus 0108, and executes a print job for inspection in the client computer 0110. If printing is executed, the inspection unit 0106 detects conveyance of a paper sheet, and scans the paper sheet using the CISs 0315 and 0316, and a scan image is transmitted to the inspection apparatus 0108 and saved in the RAM 0227. The saved image is compared with the reference image, thereby outputting an inspection result. Inspection is executed based on the setting values designated by the user in the inspection setting processing.

Font Registration UI

Details of font registration will be described next with reference to views showing UIs in FIGS. 5 and 6 and a flowchart shown in FIG. 7. FIG. 5 shows an example of a font registration screen that is displayed on the UI panel 0102 and accepts a font registration execution operation from the user.

In the font registration screen in the initial state, since an image as a registration target is not loaded, a preview image is not displayed in a preview display window 504, and a scan image load start button 501 and a character region selection button 502 are displayed. If the load start button 501 is touched, an image for font registration is printed, and then the scan image is loaded by the inspection unit 0106, and displayed on the preview display screen 504 of the UI panel 0102.

If the user presses the character region selection button 502 in this state, and then selects a frame indicating a character region by, for example, a mouse click, a character region selection operation is accepted. If the user presses a character region arrangement button 503, and then operates, by, for example, a mouse drag, a character region 505 selected on the preview display, an arrangement operation such as the movement of the character region or the change of the size is accepted. The user selects a character region to include a character string including a character to undergo font registration. A setting field 506 is a field for setting the direction of the character string in the currently selected character region. The direction of the character string is set by the angle of a character with respect to a predetermined reference direction. Reference numeral 507 denotes a button for starting character segmentation. Upon the pressing of the button 507, the screen transitions to a character segmentation screen shown in FIG. 6. If a completion button 508 is touched, the font registration processing is completed.

FIG. 6 shows the character segmentation screen displayed on the UI panel 0102. A preview screen 601 is a screen that displays a preview of an image obtained by segmenting the character region. On the font registration screen, a preview of the character region 505 set by the user is displayed, and frames indicating coordinates as the result of the character segmentation processing are displayed on the preview.

A font name input field 602 is an input field of the font name of the registration font. A font size input field 603 is an input field of the font size of the registration font. A text box 604 is an input field of a segmented character image of the character region and a character (text) associated with the segmented character image. The segmented character image is an image obtained by segmenting each character of the character string included in the character region 505. Upon the pressing of a registration button 605, the input of the registration font information ends, and the screen is closed to transition to the font registration screen shown in FIG. 5.

Font Registration Processing

FIG. 7 is a flowchart illustrating processing executed by the inspection apparatus 0108 when a font registration operation is performed for the inspection apparatus 0108. A user operation is accepted via the font registration screen and the character segmentation screen displayed on the UI panel 0102, and various kinds of processes for the CPU 0226 to perform inspection setting are executed.

In step S701, the CPU 0226 accepts a scan image load start operation from the font registration screen. In this embodiment, the scan image load start operation corresponds to the pressing of the scan image load start button 501 by the user. Upon accepting the pressing of the scan image load start button 501, the CPU 0226 shifts to a state of waiting for reception of a scan image of a printed product. After that, if a print job is executed, the scanned image is loaded.

In step S702, the user executes a print job for font registration in the client computer 0110. The CPU 0226 receives the image of the printed product scanned by the inspection unit 0106 from the inspection unit 0106 via the inspection apparatus I/F 0215 and the inspection unit I/F 0231. After that, the CPU 0226 displays the scan image on the preview display screen 504 of the font registration screen.

In step S703, the CPU 0226 ends the state of waiting for reception of the scan image of the printed product.

In step S704, the CPU 0226 accepts a character region setting operation from the font registration screen. The user sets, on the preview of the loaded image, a character region using the character region selection button 502, the character region arrangement button 503, and the setting field 506 for the direction of a character string. In accordance with the operation, a character region is set on the scan image.

In step S705, the CPU 0226 accepts a character segmentation operation from the font registration screen. In this embodiment, the character segmentation operation is the pressing of the button 507 for starting to segment a character. After accepting the pressing of the button 507 for starting to segment a character, the CPU 0226 executes processing of segmenting a character included in the character region, thereby transitioning to the character segmentation screen. The character segmentation processing is, for example, processing of calculating a histogram of pixel values with respect to the image of the character region, and segmenting, as a segmented character image, a region where the histogram of the pixel values is projected. The character segmentation method is merely an example, and there exist various forms other than that described in this embodiment. The segmented characters are displayed one by one on the left side in the text box 604 shown in FIG. 6. However, the segmented characters may be sequentially displayed or may be displayed in accordance with a user operation.

In step S706, the CPU 0226 accepts, from the character segmentation screen, an input operation of a character code to be associated with the segmented character image. In this embodiment, the user inputs a character in the text box 604. Text is input as a corresponding character code.

In step S707, the CPU 0226 accepts an input operation of a font name and a font size from the character segmentation screen. The input operation of the font name and the font size is an input operation, by the user, to the font name input field 602 and the font size input field 603 of the registration font.

In step S708, the CPU 0226 accepts a registration operation from the character segmentation screen. In this embodiment, the registration operation is the pressing of the registration button 605 by the user. After that, the CPU 0226 saves, in the storage unit 0228, as registration font data, the input font name, font size, character segmentation image, and corresponding characters, and character recognition processing and preprocessing parameters to be used. With respect to the character recognition processing and preprocessing parameters to be used, predetermined values or additionally designated values may be saved.

The font setting is performed for each font and size used in the printed product of the inspection target. If, for example, a plurality of character regions are set in one scan image, font setting is performed for each region. Conversely, one continuous region including characters to which the common font setting is applied can be selected as a character region.

Setting of Details of Inspection

Details of inspection setting will be described with reference to UIs shown in FIGS. 8A, 8B, and 12 and a flowchart shown in FIG. 9. Inspection setting is started by selecting a reference image registered in reference registration.

FIG. 8A shows an example of an inspection setting screen that is displayed on the UI panel 0102 and accepts an inspection setting execution operation from the user. On the inspection setting screen, the user arranges inspection regions (which will also be referred to as inspection target regions hereinafter) on the preview of the reference image, and individually performs setting for each inspection region. The inspection setting screen is displayed in response to execution of an operation for intervening inspection setting.

On a preview display screen 801, the registered reference image is displayed. The reference image is an image as a reference for evaluating a printed product, and is saved on a page basis. In a case of reference images for a print job of a plurality of pages, an operation of switching a page to undergo a preview display can be accepted to display the reference image of each page.

Each of inspection frames 802 and 803 is a frame representing an example of an inspection region as an inspection target arranged on the preview display screen 801. The inspection region can be arranged on the preview display screen 801 in accordance with a touch of an inspection region arrangement button 805, and the size and position of the inspection region can be changed by a user operation such as a mouse drag. The inspection frame 802 represents an example in which a pattern is arranged as an inspection region. The inspection frame 803 represents an example in which a character string is arranged as an inspection region.

An inspection region selection button 804 is a button for selecting an inspection region. If an inspection region selection operation is accepted when the user presses the inspection region selection button 804 and then clicks a mouse on the inspection frame 802 or 803 indicating an inspection region, the clicked inspection region is set in a selected state.

The inspection region arrangement button 805 is a button for setting an inspection region. The user presses the inspection region arrangement button 805, selects a type of an inspection region from a displayed pull-down menu, and then selects a region to be designated as an inspection region on a preview display by an operation such as a mouse drag, thereby accepting an inspection region arrangement operation. This sets the inspection region. The types of the inspection region include a character string, a barcode, and a pattern (image), and an inspection type may be determined for each type of the inspection region. Note that in inspection, the quality of an image formed in the inspection region may be evaluated in accordance with the set type and it may be determined whether an evaluation result reaches a predetermined level. Inspection includes data inspection in a case in which a barcode or a character string is set as the type of the inspection region, and image quality inspection in a case in which an image is set as the type of the inspection region.

A setting item 806 is a setting item for selecting collation inspection data by a file selection method. The collation inspection data is a reference CSV file for data inspection to be collated with data of the inspection region at the time of executing data inspection. The reference CSV file is a file to be prepared in advance by the user, and is a file in which correct answer character strings of character string inspection and barcode inspection are listed. If, at the time of executing data inspection, the selected type of the inspection region is a character string, a character string recognized from the image of the inspection region is collated with the correct answer character string listed in the reference CSV file. If the selected type of the inspection region is a barcode, a character string decoded from the image of the inspection region is collated with the correct answer character string listed in the reference CSV file.

In a currently selected region setting field 807, individual (or unique) setting values are displayed for each inspection region selected by the inspection region selection button

804. FIG. 8A shows a case in which the currently selected type of the inspection region is a character string.

In a page range setting field 808, an operation of designating a page range where inspection is executed by setting the currently selected inspection region as an inspection target is accepted when the user presses each button arranged in the field. If nothing is selected as a page range, the currently selected inspection region is arranged only in a page currently displayed on the preview display screen. If "same surface as current page" is selected, the currently selected inspection region is arranged in a page of the same surface in accordance with the front or back surface of the sheet on which the currently selected inspection region is arranged. If "all pages" is selected, the currently selected inspection region is arranged in all the pages. Note that the inspection region is set in a page registered as reference image data, and numbers may be assigned to pages in accordance with the printing order or the registration order.

A character string inspection setting field 809 is a setting item for character inspection displayed when the character string inspection region 803 is selected. For each inspection region, the angle of the inspection region, the font of the character string, whether to execute collation inspection, and, if collation inspection is executed, a specific column of the reference CSV file selected in the setting item 806 to be used for collation are set.

A font setting field 810 is a setting item of the font displayed when the character string inspection region 803 is selected. Items for selecting the font of the character string are displayed, and a font selection is accepted from the user. The font setting may be saved in linkage with the inspection region.

A font presentation check box 811 is a setting item for selecting whether to present the font when the character string inspection region 803 is arranged. When the user presses the check box 811, "present" or "not present" is selected. If "present" is selected, processing of narrowing registration font data is performed (the processing will be described later) in processing of storing the registration font data in a candidate list. If "not present" is selected, no processing of narrowing the registration font data is performed in the processing of storing the registration font data in the candidate list. That is, all the registration font data are stored in the candidate list.

An OK button 812 is a button for completing the inspection setting. If the user presses the OK button 812, the inspection setting is completed, and the settings are saved in the storage unit 0228, thereby ending the inspection setting processing. If the settings include inconsistency, the OK button 812 for the inspection setting may be disabled not to be pressed. Inconsistency of the settings is caused in, for example, a case in which there exists an inspection region where collation inspection is executed but the setting item 806 of the collation inspection data is not set.

A cancel button 813 is a button for canceling the inspection setting. If the user presses the cancel button 813, the settings are discarded to end the inspection setting processing.

Figure 8B:
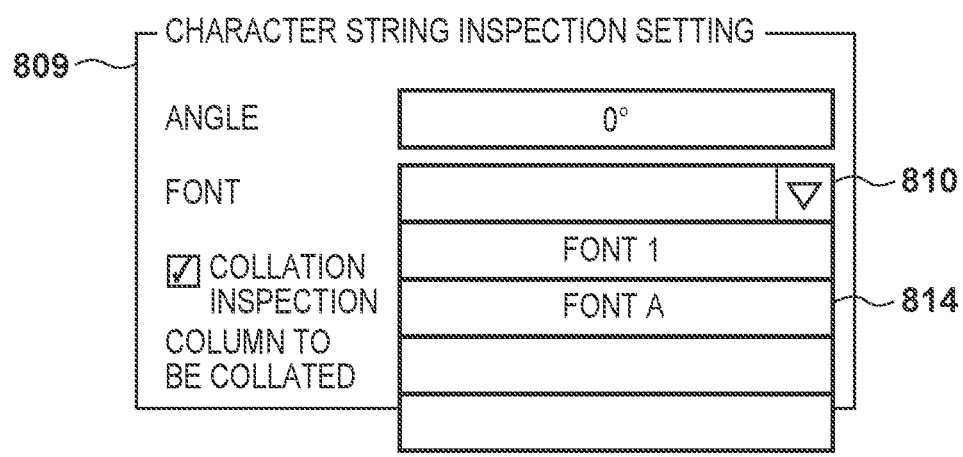
FIG. 8B is a view showing a character string inspection setting item screen.

FIG. 8B shows an example of the candidate list displayed in the character string inspection setting field 809 when selecting the font of the character string. The candidate list is displayed when a font selection is accepted from the user.

A pull-down menu 814 is a pull-down menu displayed when a font selection is accepted from the user. In one example, the font candidate list generated in the processing of storing the registration font data in the candidate list (the processing will be described later) is displayed in the pull-down menu 814. By selecting the registration font data from the candidate list displayed in the pull-down menu, the font to be used for inspection is set in the font setting field 810.

Figure 12:
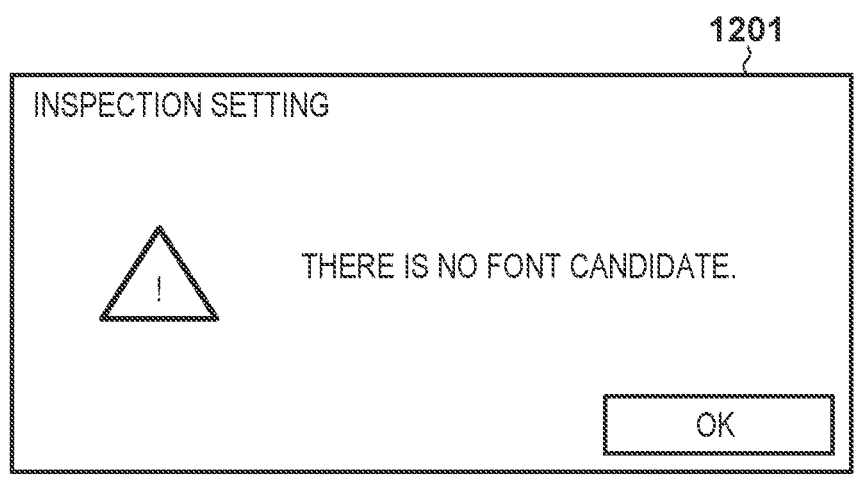
FIG. 12 is a view showing a dialog box displayed if there is no font candidate.

FIG. 12 shows an example of a dialog box 1201 displayed on the UI panel 0102. In processing of determining whether there exists registration font data in the candidate list (the processing will be described later), if there is no font candidate, the dialog box 1201 is displayed.

Inspection Setting Processing

Figure 9:
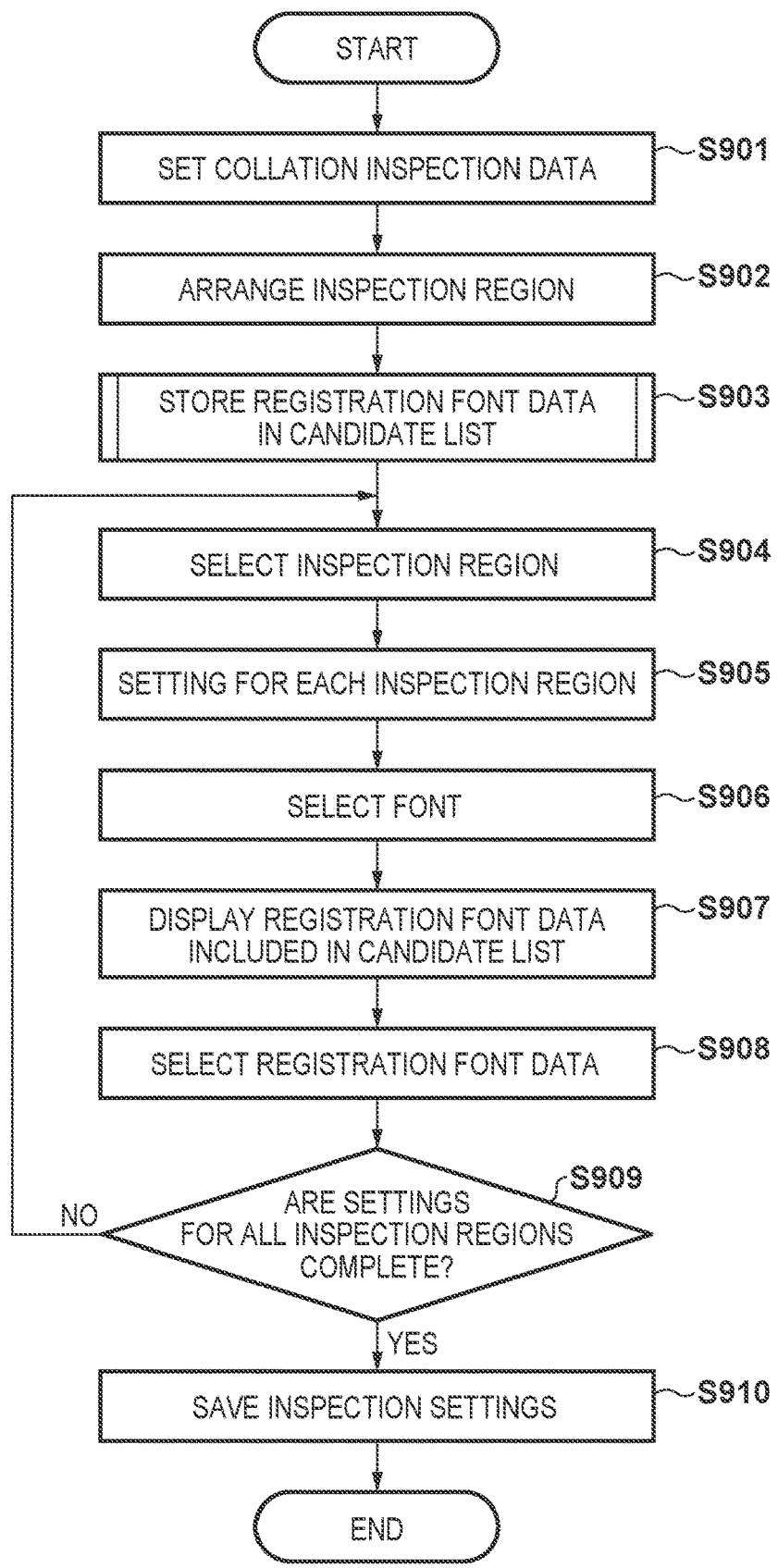
FIG. 9 is a flowchart illustrating inspection setting.

FIG. 9 is a flowchart illustrating processing in the information processing apparatus 0109 if an inspection setting start operation is performed for the inspection apparatus 0108. A user operation on the inspection setting screen displayed on the UI panel 0102 and the inspection region list is accepted, and various kinds of processes for the CPU 0234 to perform inspection setting are executed. Note that setting of an inspection region of a character string type will be described with reference to FIG. 9, and a description of other types will be omitted. At the start of FIG. 9, reference image data has been received from the inspection apparatus 0108. In addition, the inspection setting screen is currently displayed. Note that since the information processing apparatus 0109 performs inspection setting for an inspection target region or range, it will sometimes be referred to as an inspection setting apparatus or an inspection setting system hereinafter. In this example, the inspection settings (inspection setting information) input to the information processing apparatus 0109 are transmitted to the inspection apparatus 0108, and are used to perform inspection.

In step S901, the CPU 0234 accepts a setting operation of collation inspection data from the inspection setting screen. In this embodiment, the setting operation of collation inspection data is a user operation on the setting item 806 of the collation inspection data.

In step S902, the CPU 0234 accepts an inspection region arrangement operation from the inspection setting screen. In this embodiment, the inspection region arrangement operation includes a user operation on the inspection region arrangement button 805 and a corresponding setting operation of the arrangement and type of the inspection region.

In step S903, the CPU 0234 performs processing of deciding font candidates from registration fonts with respect to the inspection region accepted in step S902, and storing them. This processing will be described later with reference to a flowchart shown in FIG. 10.

In step S904, the CPU 0234 accepts an inspection region selection operation from the inspection setting screen. In this embodiment, the inspection region selection operation includes a user selection of an inspection region and an operation on the inspection region selection button 804.

In step S905, the CPU 0234 accepts, from the inspection setting screen, a setting operation for each inspection region. In this embodiment, the setting operation for each inspection region is a user operation on the setting field 808 for each inspection region. That is, in step S905, an operation for setting a page range and setting character string inspection is accepted. However, the setting targets in step S905 exclude a font setting.

In step S906, the CPU 0234 accepts a font selection operation from the character string inspection setting item screen. In this embodiment, the font selection operation is a user operation on the character string inspection setting field 809. Furthermore, the user can select a font from the font candidates decided in step S903, thereby reducing the labor of selection. Note that in FIG. 9, the font is set (step S906) after setting items other than the font (step S905). This is for the descriptive convenience of the font setting, and the setting of the inspection region is not particularly restricted in terms of the order.

In step S907, the CPU 0234 displays, on the pull-down menu 814 (FIG. 8B), the candidate list acquired in step S903 in accordance with the operation on the font setting field 810. Note that as a method of displaying the candidate list, only the registration font data included in the candidate list may be displayed or while displaying all the registration font data, the registration font data included in the candidate list may be highlighted. The registration font data may be displayed in descending order of likelihood.

Display of the registration font data will be described with reference to FIGS. 14A, 14B, 14C, and 14D. FIG. 14A shows examples of all registration font data 1401. FIG. 14B shows an example of a candidate list 1402. In FIG. 14C, only the registration font data included in the candidate list 1402 are displayed on the pull-down menu 814. In FIG. 14D, while displaying all the registration font data, the registration font data included in the candidate list are highlighted.

In step S908, the CPU 0234 accepts a registration font data selection operation from the pull-down menu 814. In this embodiment, the registration font data selection operation is a user operation of selecting a font from the pull-down menu 814.

In step S909, the CPU 0234 determines whether the inspection setting by the user is complete. If the inspection setting is complete, the user presses the OK button 812 of the inspection setting, and the process advances to step S910. If the inspection setting is incomplete, the user continues the inspection setting. In step S910, the CPU 0234 transmits the set information (setting information) to the inspection apparatus 0108. The inspection apparatus 0108 saves the setting information in the storage unit 0228, thereby ending the inspection setting processing. Note that the processing shown in FIG. 9 may be executed by the inspection apparatus 0108 instead of the information processing apparatus 0109. In this case, in step S910, the setting information may be saved without being transmitted. Note that the set registration font data is used as a reference for character recognition, and will thus be referred to as a reference font or reference font data hereinafter.

The above procedure performs inspection setting. With respect to a character string inspection region, font data selected from the registration font data as setting candidates is set. At the time of inspection, a character string image at a position within a range corresponding to the character string inspection region is segmented from a document image read from a printed sheet, and is set as a target of character recognition with reference to the set font data (set font). The result of character recognition is evaluated in, for example, the same manner as in step S1003 of FIG. 10 (to be described later), and a match or mismatch with the set font is determined.

Figure 10:
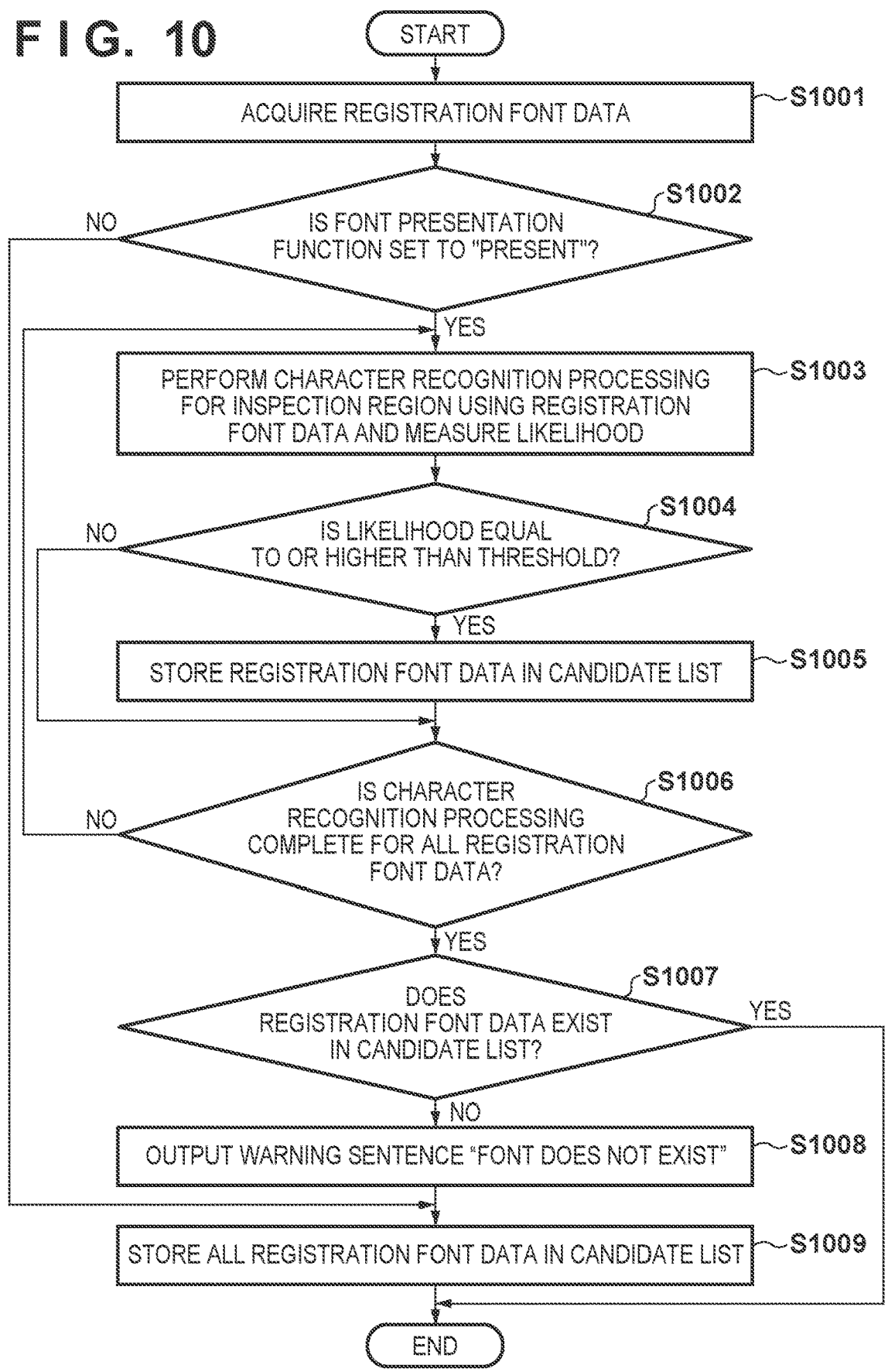
FIG. 10 is a flowchart illustrating processing of storing registration font data in a candidate list.

FIG. 10 is a flowchart illustrating details of the processing (step S903) of storing the registration font data in the candidate list. The CPU 0234 of the information processing apparatus 0109 executes various kinds of processes for calculating font candidates.

In step S1001, the CPU 0234 acquires all the registration font data from the storage unit 0236 into the RAM 0235. The registration font data are data registered by the UI and procedure described with reference to FIGS. 6 and 7.

In step S1002, the CPU 0234 determines whether the font presentation function 811 is set to "present". If "present" is set, the process advances to step S1003; otherwise, the process advances to step S1009.

In step S1003, the CPU 0234 performs character recognition processing for the inspection region using the registration font data, and measures the likelihood. If there are a plurality of sets of registration font data, this processing is performed by sequentially paying attention to one of the registration font data and using the registration font data of interest. The likelihood represents the likelihood that a character string in the inspection region is the same as the shape image in the registration font data. In the character recognition processing according to this embodiment, an image in the registration font data of interest is compared with the character image included in the inspection region of the image to be read, and the character string data of the registration font image with the highest similarity is obtained as a recognition result. This similarity is set as the likelihood. For example, if character recognition is performed using a statistical discriminant function such as the Bayes discriminant method, the likelihood is obtained based on the feature amount of an input character and the feature amount of a reference character, and thus the value may be used. As described above, the likelihood in this embodiment indicates the similarity. Therefore, for example, in a method of representing the similarity by the distance of the feature amount (feature vector), the distance can be the similarity or likelihood.

In step S1004, the CPU 0234 determines whether the likelihood measured in step S1003 is equal to or higher than a threshold. If the likelihood is equal to or higher than the threshold, the process advances to step S1005; otherwise, the process advances to step S1006. For example, in step S1003, by using the registration font data of interest as a reference, character recognition for the image in the inspection region may be executed in the same manner as that for character recognition performed in actual inspection. As a result, it may be determined in step S1004 whether the likelihood of the recognized character is equal to or higher than the threshold.

Note that if the inspection region includes a plurality of characters, the likelihood may be obtained for each registration font with respect to each character, and it may be determined in step S1004, for all the characters, whether the likelihood is equal to or higher than the threshold. Alternatively, the likelihood may be obtained for each character, and it may be determined in step S1004 whether the average likelihood is equal to or higher than the threshold.

In step S1005, the CPU 0234 stores, in the candidate list, the registration font data for which it is determined that the likelihood is equal to or higher than the threshold.

In step S1006, the CPU 0234 determines whether the character recognition processing is complete for all the registration font data. If the processing is incomplete, the process returns to step S1003, and the processing is repeated by paying attention to the new registration font data. If the processing is complete, the process advances to step S1007.

In step S1007, the CPU 0234 determines whether there exists registration font data in the candidate list. If there is no registration font data, the process advances to step S1008; otherwise, the processing of storing the registration font data in the candidate list ends.

In step S1008, the CPU 0234 displays a warning on the UI panel 0203, and outputs a warning sentence, for example, "There is no font. Please register font." The warning is indicated by, for example, the dialog box 1201 exemplified in FIG. 12. Note that the warning sentence is merely an example, and the present invention is not limited to this.

In step S1009, the CPU 0234 stores all the registration font data in the candidate list. After that, the CPU 0234 ends the processing of storing the registration font data in the candidate list.

In step S1003 of FIG. 10, the likelihood may be obtained for each of all inspection regions in a page (to be referred to as a page of interest) including the current inspection region, and steps S1004 and S1005 may be executed for each inspection region. In this case, a candidate list is created on a page basis. Instead of this, steps S1001 to S1009 may be executed for each inspection region, and a candidate list may be created in linkage with each inspection region. In this case, in step S907 of FIG. 9, the registration fonts of the candidate list linked with the selected inspection region are displayed. Furthermore, a candidate list may be associated with all the pages (that is, all pages included in the reference image) as inspection targets including a plurality of pages.

With the above processing, if there is registration font data including a character corresponding to a character in the inspection region of the reference image, the registration font data is registered in the candidate list as a font setting candidate of the inspection region. On the other hand, if there is no corresponding registration font, all the registration fonts are registered in the candidate list.

Inspection Processing

Figure 11:
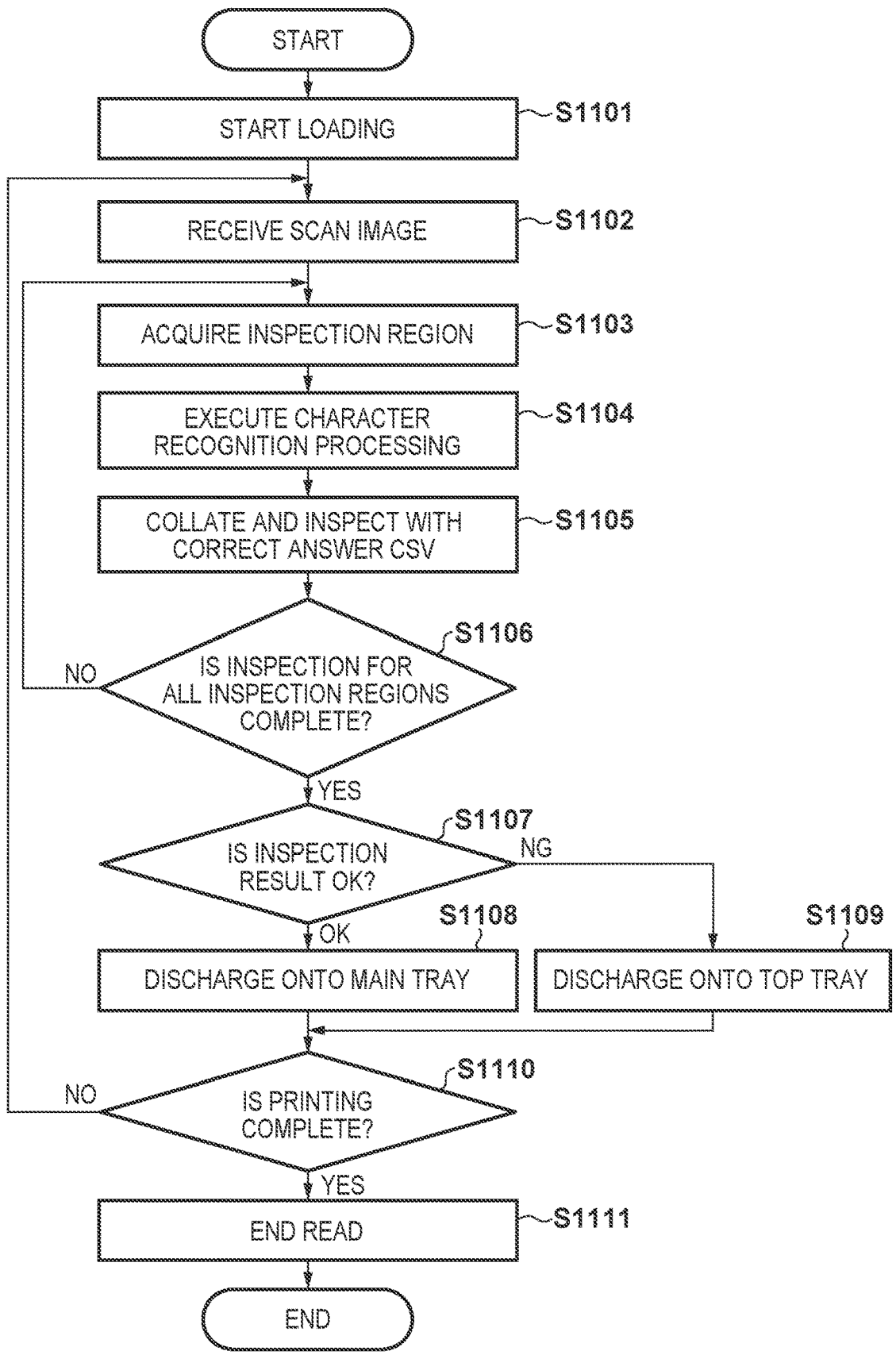
FIG. 11 is a flowchart illustrating inspection.

Details of inspection will be described next with reference to a flowchart shown in FIG. 11. In accordance with an execution instruction of inspection processing via the input device of the inspection apparatus or the UI panel 0102 of the image forming apparatus 0101, the CPU 0226 of the inspection apparatus 0108 executes various kinds of processes for performing inspection.

In step S1101, the CPU 0226 loads the inspection settings from the storage unit 0228 into the RAM 0227, and starts to load a scan image. The CPU 0226 shifts to a state of waiting for reception of a scan image of a printed product. After that, if a print job is executed, a scanned image is loaded.

In step S1102, the user executes a print job of an inspection target in the client computer 0110. The CPU 0226 receives, from the inspection unit 0106 via the inspection apparatus I/F 0215 and the inspection unit I/F 0231, an image of the printed product scanned by the inspection unit 0106.

In step S1103, the CPU 0226 acquires, from the scan image received from the inspection unit 0106, an image (to be referred to as an inspection region image hereinafter) corresponding to the inspection region designated in the inspection settings.

In step S1104, the CPU 0226 executes character recognition processing for the inspection region image using the registration font data. This character recognition processing may be executed in the same manner as in step S1003 of FIG. 10.

In step S1105, the CPU 0226 collates a character recognition result with the reference CSV file (correct answer CSV). As a result of collation, if a mismatch is determined, the inspection result of the inspection region is NG, and if a match is determined, the inspection result is OK. In step S1105, with respect to the inspection region of the character string type, character recognition is performed with reference to the font data set in association with the inspection region, and a character recognition result is collated with the reference CSV data. That is, it is determined whether the character image of the inspection region matches with the set font data in terms of the font type, size, and direction.

In step S1106, the CPU 0226 determines whether inspection is complete for the inspection region designated in the inspection settings. If the inspection is complete, the process advances to step S1107; otherwise, the process returns to step S1103.

In step S1107, the CPU 0226 determines the result of the inspection. If the inspection for all the inspection regions in the scan image is OK, the process advances to step S1108; otherwise, the process advances to step S1109.

In step S1108, the CPU 0226 instructs the large capacity stacker 0107 to output a printed product, for which the inspection is OK, onto the main tray of the discharge unit 0223 of the large capacity stacker 0107.

In step S1109, the CPU 0226 instructs the large capacity stacker 0107 to output a printed product, for which the inspection is NG, onto the top tray of the discharge unit 0223 of the large capacity stacker 0107.

In step S1110, the CPU 0226 determines whether the inspection of the printed product as an inspection target is complete. If the inspection is incomplete, the process returns to step S1102; otherwise, the process advances to step S1111.

In step S1111, the CPU 0226 ends the state of waiting for reception of the scan image of the printed product. After that, the CPU 0226 ends the inspection processing.

With the above procedure, according to this embodiment, by presenting font candidates to the user before confirming the font setting for an inspection region, it is possible to set a font without putting a labor on the user. In addition, by selecting a font from similar fonts and setting it, it is possible to correctly set the font.

Second Embodiment

If an inspection region (to be referred to as an "arranged inspection region" hereinafter) is surrounded, the arranged inspection region may be arranged at a position close to an inspection region (to be referred to as an "inspection region in another page" hereinafter) surrounded in another page. At this time, the arranged inspection region and the inspection region in the other page may have the same font. Therefore, it is possible to reduce the number of times of processing of obtaining the likelihood by narrowing the registration font data for obtaining candidates, thereby increasing the processing speed. In the second embodiment, if the arranged inspection region is arranged at a position close to the inspection region in the other page, the registration font data candidates are further narrowed using the candidate list presented for the inspection region in the other page. Note that the following description will be provided by omitting parts common to the above-described embodiment.

Figure 13A:
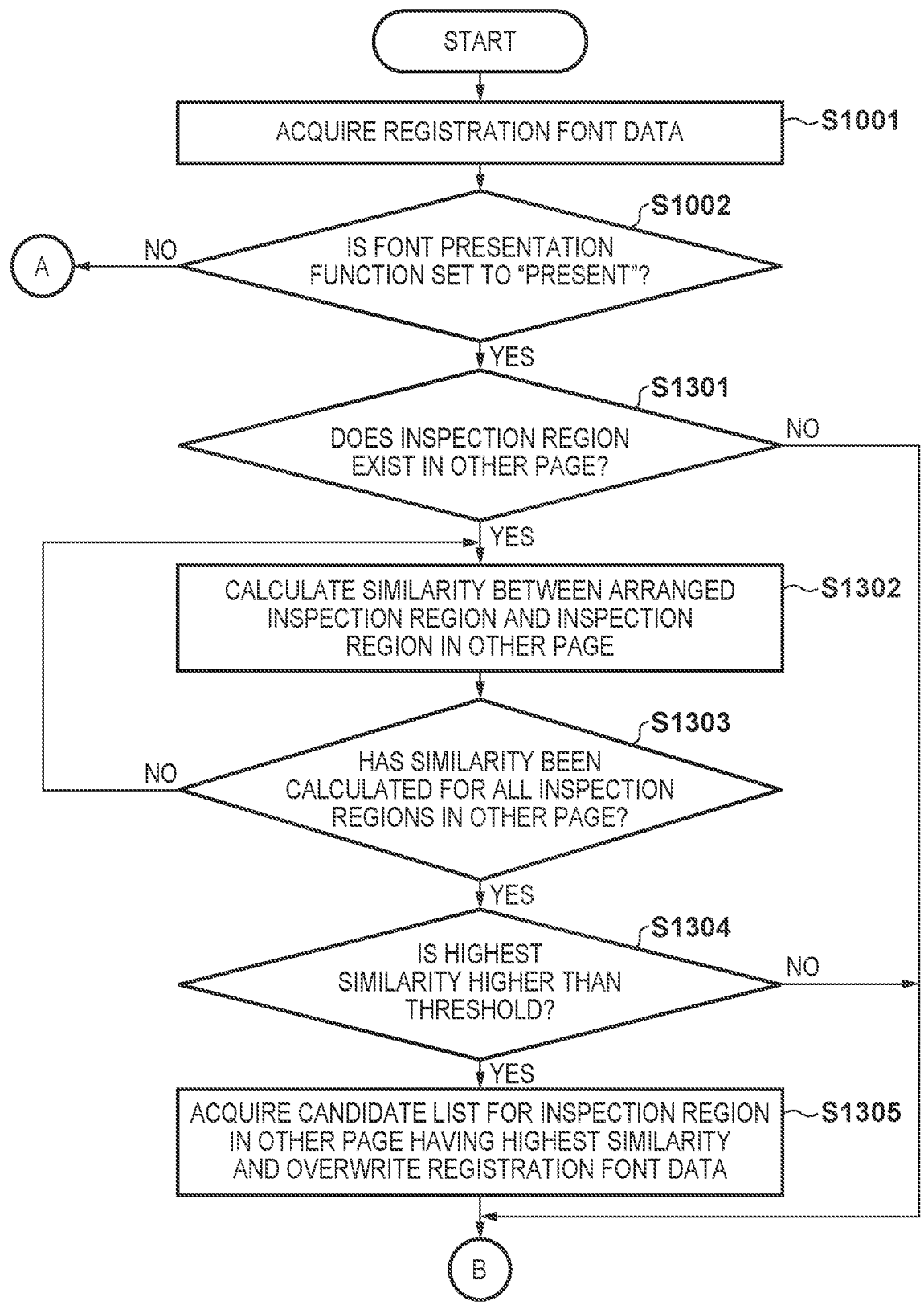
FIGS. 13A and 13B shows a flowchart illustrating processing of storing registration font data in a candidate list according to the second embodiment.
Figure 13B:
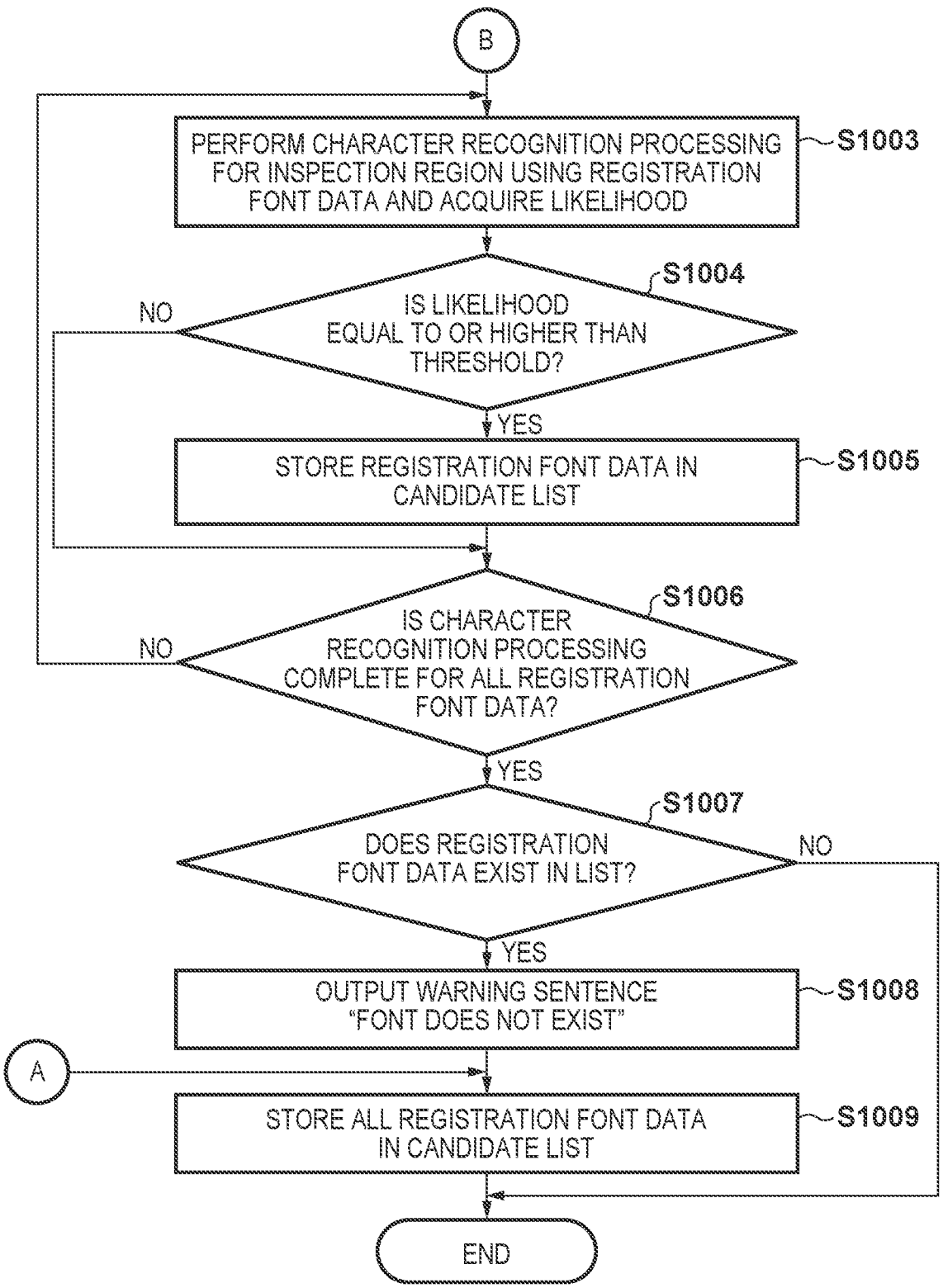

FIGS. 13A and 13B show a flowchart illustrating processing of calculating font candidates according to the second embodiment. A CPU 0234 of an information processing apparatus 0109 executes various kinds of processes for calculating font candidates.

Steps S1001 and S1002 are the same processing steps as those denoted by the same reference symbol in the flowchart shown in FIG. 10.

In step S1301, the CPU 0234 determines whether there is an inspection region in another page. If there is an inspection region, the process advances to step S1302; otherwise, the process advances to step S1003.

In step S1302, the CPU 0234 calculates the similarity between the arranged inspection region and the inspection region in the other page. In one example, if a page including the arranged inspection region is arranged to overlap the other page, a value obtained by dividing, by the area of the arranged inspection region, an area where the inspection regions in the two pages overlap each other is set as the similarity. The pages are superimposed on each other on the data. Note that the similarity calculation method is not limited to this. The other page may be a page before the page including the inspection region as the current processing target, that is, a page for which a candidate list has already been created.

In step S1303, the CPU 0234 determines whether the similarity has been calculated for all the inspection regions in the other page. If the similarity has been calculated for all the inspection regions, the process advances to step S1304; otherwise, the process returns to step S1302.

In step S1304, the CPU 0234 determines whether the highest similarity is higher than a threshold. If the highest similarity is higher than the threshold, the process advances to step S1305; otherwise, the process advances to step S1003.

In step S1305, the CPU 0234 acquires the candidate list for the inspection region in the other page having the highest similarity, and overwrites the registration font data acquired in step S1001. In this case, the candidate list is created for each inspection region. The inspection region in the other page having the highest similarity will be referred to as a corresponding inspection region with respect to the original inspection region.

Steps S1003 to S1009 are the same processing steps as those denoted by the same reference symbols in the flowchart shown in FIG. 10.

With the above procedure, according to this embodiment, if the arranged inspection region is arranged at a position close to the inspection region in the other page, the registration font data candidates are further narrowed using the candidate list presented for the inspection region in the other page. Therefore, it is possible to decrease the registration font data for each of which the likelihood is obtained, thereby increasing the processing speed.

Note that the procedure shown in FIGS. 13A and 13B may also be executed by an inspection apparatus 0108.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-041761, filed Mar. 16, 2022 which is hereby incorporated by reference herein in its entirety.

What is claimed is:

1. An information processing apparatus comprising:
    at least one memory configured to store at least one program; and
    at least one processor,
    wherein the at least one program causes the at least one processor to:
    (1) display, on a display, a setting screen including a preview display of a reference image,
    (2) register, in a candidate list, in association with an inspection region of the reference image set on the setting screen, font data selected from among preregistered registration font data as a candidate of reference font data as a reference for character recognition at the time of inspection of a printed product, and
    (3) set the reference font data in association with the inspection region on the setting screen in accordance with a user selection from the candidate list,
    wherein in the registering, among the preregistered registration font data, font data whose similarity with a character string of the inspection region of the reference image exceeds a threshold is registered in the candidate list,
    wherein the font data registered in the candidate list associated with a second inspection region included in another page other than a target page is used as the registration font data for generating the candidate list to be associated with an inspection region in the target page, and
    wherein the second inspection region is an inspection region that has the largest overlap rate with the target inspection area in the target page and the overlap rate exceeds a threshold value in case where the target page is arranged to overlap the another page.

2. The apparatus according to claim 1, wherein in the registering, if there is no font data whose similarity exceeds the threshold, all the registration font data are registered in the candidate list.

3. The apparatus according to claim 2, wherein in the registering, if there is no font data whose similarity exceeds the threshold, the user is notified that there is no font data to be registered in the candidate list.

4. The apparatus according to claim 1, wherein in the registering, character recognition is performed for the inspection region with reference to the registration font data, and the font data whose similarity exceeds the threshold is registered in the candidate list.

5. The apparatus according to claim 1, wherein the at least one program causes the at least one processor to:
    (1) further set, in the setting, whether to display the candidate list at the time of setting the reference font data, and
    (2) register, in the registering, all the registration font data in the candidate list if it is not set to display the candidate list.

6. The apparatus according to claim 1, wherein the at least one program causes the at least one processor to further register, as the registration font data, a character image selected from an image displayed on the display.

7. The apparatus according to claim 1, wherein in the setting, names of the font data included in the candidate list are displayed as a list, and the font data selected from the list is set as the reference font data.

8. An inspection system comprising:
an information processing apparatus;
an image forming apparatus; and
an inspection apparatus configured to inspect, using reference font data set by a setting unit, a character image formed by the image forming apparatus,
wherein the information processing apparatus comprises
(A) at least one memory configured to store at least one program, and
(B) at least one processor,
wherein the at least one program causes the at least one processor to
(1) display, on a display, a setting screen including a preview display of a reference image,
(2) register, in a candidate list, in association with an inspection region of the reference image set on the setting screen, font data selected from among preregistered registration font data as a candidate of reference font data as a reference for character recognition at the time of inspection of a printed product, and
(3) set the reference font data in association with the inspection region on the setting screen in accordance with a user selection from the candidate list,
wherein in the registering, among the preregistered registration font data, font data whose similarity with a character string of the inspection region of the reference image exceeds a threshold is registered in the candidate list,
wherein the font data registered in the candidate list associated with a second inspection region included in another page other than a target page is used as the registration font data for generating the candidate list to be associated with an inspection region in the target page, and
wherein the second inspection region is an inspection region that has the largest overlap rate with the target inspection area in the target page and the overlap rate exceeds a threshold value in case where the target page is arranged to overlap the another page.

9. A non-transitory computer-readable storage medium storing thereon a program which, when loaded into a computer and executed, causes the computer to execute a process, the process comprising:
displaying, on a display, a setting screen including a preview display of a reference image;
registering, in a candidate list, in association with an inspection region of the reference image set on the setting screen, font data selected from among preregistered registration font data as a candidate of reference font data as a reference for character recognition at the time of inspection of a printed product; and
setting the reference font data in association with the inspection region on the setting screen in accordance with a user selection from the candidate list,
wherein in the registering, among the preregistered registration font data, font data whose similarity with a character string of the inspection region of the reference image exceeds a threshold is registered in the candidate list,
wherein the font data registered in the candidate list associated with a second inspection region included in another page other than a target page is used as the registration font data for generating the candidate list to be associated with an inspection region in the target page, and
wherein the second inspection region is an inspection region that has the largest overlap rate with the target inspection area in the target page and the overlap rate exceeds a threshold value in case where the target page is arranged to overlap the another page.

10. A setting method for inspection of an image by an information processing apparatus including a preview unit, a registration unit, and a setting unit,
wherein the information processing apparatus
(1) displays, on a display, a setting screen including a preview display of a reference image,
(2) registers, in a candidate list, in association with an inspection region of the reference image set on the setting screen, font data selected from among preregistered registration font data as a candidate of reference font data as a reference for character recognition at the time of inspection of a printed product,
(3) sets the reference font data in association with the inspection region on the setting screen in accordance with a user selection from the candidate list, and
(4) registers, at the time of registering the font data in the candidate list, among the preregistered registration font data, font data whose similarity with a character string of the inspection region of the reference image exceeds a threshold in the candidate list,
wherein the font data registered in the candidate list associated with a second inspection region included in another page other than a target page is used as the registration font data for generating the candidate list to be associated with an inspection region in the target page, and
wherein the second inspection region is an inspection region that has the largest overlap rate with the target inspection area in the target page and the overlap rate exceeds a threshold value in case where the target page is arranged to overlap the another page.

* * * * *